Figure 1:
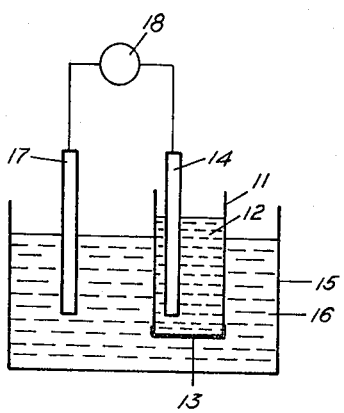

Aug. 20, 1968     A. ILANI     3,398,066

METHOD AND APPARATUS FOR THE DETERMINATION OF K AND $N_a$

Filed March 19, 1965

INVENTOR.

Asher Ilani

BY Tourover and Browdy
attorneys

United States Patent Office 3,398,066
Patented Aug. 20, 1968

3,398,066
METHOD AND APPARATUS FOR THE
DETERMINATION OF K AND Na
Asher Ilani, Jerusalem, Israel, assignor to Yissum Research Development Company, Jerusalem, Israel, a company of Israel
Filed Mar. 19, 1965, Ser. No. 441,015
Claims priority, application Israel, Apr. 24, 1964, 21,246
11 Claims. (Cl. 204—1)

It is an object of the present invention to provide a novel device for the determination of potassium and of sodium. It is a further object of the present invention to provide a novel method for the determination of sodium and potassium, especially in biological fluids. Other and further objects of the invention will become apparent hereinafter.

At present the determination of potassium is rather cumbersome. When carried out with a flame photometer, rather expensive equipment is required, and the sensitivity of the apparatus is so great that certain inaccuracies are apt to be due to dilutions carried out. The present invention is also of value for the determination of potassium in other materials.

The present invention is based on the unexpected discovery that certain membranes, imbued with selected organic liquids, are selective membranes for the passage of potassium ions from aqueous solutions containing both ions of potassium and of sodium. It is further based on the discovery that by using selected organic liquids for imbuing the membranes, there may be obtained values indicative of potassium by itself and of the combination of sodium and potassium, so that 2 measurements give a quantitative indication of each of these constituents in biological or other system.

The measurement according to the present invention is cried out by inserting a solution to be tested in a vessel which is separated from a second vessel by a membrane imbued with a suitable organic fluid, as will be explained in detail hereinafter, inserting a solution of predetermined concentration in the second vessel, inserting in each of the vessels a reference electrode, and measuring the potential difference between these electrodes.

The potential difference measured will indicate, according to the liquid used for imbuing the membrane, either the combined value of potassium and sodium or of potassium alone.

As membrane there may be used cellulose ester membranes such as VC-Millipore filter.

When the membrane is imbued with toluene, the value obtained will indicate the quantity of potassium present. Instead of toluene there may also be used organic liquids, such as benzene, xylene, chloroform and the like. When saturated with bromobenzene, instead of toluene, the membrane has the same degree of K-Na discrimination but has substantially lower resistance. Potential difference can be then measured very accurately by a simple potentiometer. This kind of electrode might be useful for students' laboratory, since it does not require an expensive electrometer for measuring potential differences.

When the membrane is imbued with octanol, the value obtained will be indicative of the combined quantities of potassium and sodium. Instead of octanol there may also be used butanol, heptanol and the like.

The present invention will now be described with reference to the following example, which is to be construed in an illustrative and non-limitative manner.

Example.—Simultaneous determination of potassium and and of sodium

The quantitative determination of potassium and sodium in a solution containing various amounts of these ions or in plasma or serum was carried out in a device as illustrated by FIG. 1, in which 11 is vessel containing the reference solution 12, which is closed at its lower end by means of a suitable membrane 13 and which is provided with a reference electrode 14, the vessel 11 being positioned in a second vessel 15, containing the test solution 16 and the reference electrode 17, both of the electrodes 14 and 17 being connected with the millivoltmeter 18.

The membrane 13 is first imbued with octanol, and into the vessel 11 there is introduced an aqueous solution containing 0.3 meq. potassium per liter and 13 meq. sodium per liter, which solution is saturated with respect to octanol by adding thereto a few drops of this compound. Into vessel 15 there is introduced plasma or serum, diluted with distilled water in a ration of 1:10 serum to water. The potential is read on the millivoltmeter after introduction of the calomel reference electrodes 14 and 17, and after this the measurement is repeated, but with toluene as imbuing medium of the membrane.

Figure 2:
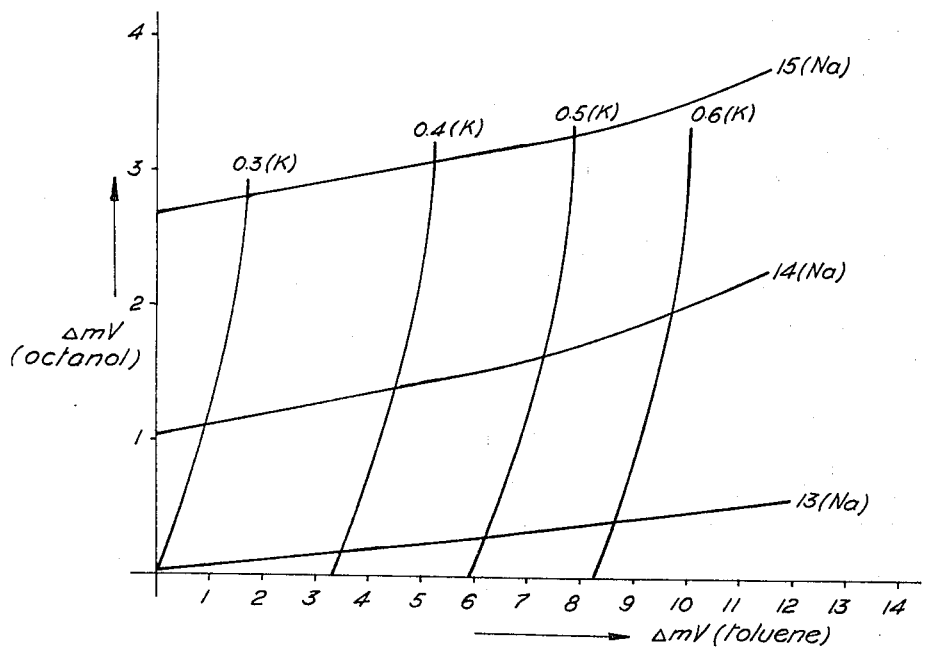

The two values obtained are used for indicating simultaneously the content of sodium and potassium of the solution tested. This is accomplished with the aid of a diagram as set out in FIG. 2, which is prepared before for any given reference solution. This diagram contains two sets of curves: vertical curves, indicating values of potassium, and horizontal, indicating values of sodium. The potential difference obtained with the toluene-imbued membrane is read off on the X-coordinate, while that obtained with the octanol-imbued membrane is read off on the Y-coordinate, and the intersection of these two values provides immediately the concentrations of both sodium and potassium.

It is clear that the present invention can be used for the quantitative determination of potassium in any sample, provided that this is first converted into an aqueous solution of a water-soluble salt.

I claim:

1. A device for the determination of potassium and sodium comprising two containers, the first container containing the solution to be tested and the other container containing a reference solution of known composition, said containers having as a common boundary for their contents a suitable membrane which has been imbued with an organic liquid selected from the group consisting of octanol, butanol and heptanol, and means for measuring the potential difference between the liquids in the two containers.

2. A method for the determination of sodium and potassium which comprises preparing a solution of the material to be tested, inserting the solution into a container having as a boundary common with the contents of a second container a membrane imbued with an organic liquid selected from the group consisting of octanol, butanol and heptanol, inserting a reference solution of known composition into the second container and measuring the electromotive force between the solutions in the two containers.

3. A method as claimed in claim 2, wherein the membrane is a cellulose ester membrane.

4. A method for the determination of sodium and potassium in a solution to be tested which comprises placing a solution of the material to be tested into a container having as a common boundary with the contents of a second container a membrane imbued with a liquid selected from the group consisting of octanol, butanol, and heptanol, inserting a reference solution into the second container said solution containing a known quantity of potassium and sodium and to which has been added a few drops of the liquid with which the membrane has been imbued, and measuring the electric potential between the solutions in the two containers; and repeating the above steps while substituting as the liquid with which the membrane is imbued a liquid selected from the group consisting of toluene, benzene, xylene and chloroform; and determining the content of sodium and potassium in the test solution by reading from a diagram which has been previously prepared from known solutions.

5. A method in accordance with claim 4 wherein the first mentioned liquid is octanol and the second mentioned liquid is toluene.

6. A method for the determination of potassium in a solution to be tested which comprises placing a solution of the material to be tested in a container having as a common boundary with the contents of a second container a membrane imbued with a liquid selected from the group consisting of toluene, benzene, xylene and chloroform, inserting a reference solution into the second container, said solution containing a known quantity of potassium, and measuring the electric potential between the solutions in the two containers, and determining the content of potassium in the test solution by reading from a diagram which has been previously prepared from known solutions.

7. A method in accordance with claim 6 wherein the membrane is imbued with toluene.

8. A device for the determination of potassium comprising two containers, the first container containing the solution to be tested and the other container containing a reference solution of known composition, said containers having as a common boundary for their contents a suitable membrane which has been imbued with an organic liquid selected from the group consisting of toluene, benzene, xylene and chloroform, and means for measuring the potential difference between the liquids in the two containers.

9. A device in accordance with claim 8 wherein the liquid is toluene.

10. A method for the determination of potassium which comprises preparing a solution of the material to be tested, inserting the solution into a container having as a boundary common with the contents of a second container a membrane imbued with an organic liquid selected from the group consisting of toluene, benzene, xylene and chloroform, inserting a reference solution of known composition into the second container and measuring the electromotive force between the solutions in the two containers.

11. A method as claimed in claim 10, wherein the membrane is a cellulose ester membrane.

References Cited

UNITED STATES PATENTS 2,288,180　6/1942　Brengman et al. _____ 204—195
3,143,488　8/1964　Arthur et al. _____ 204—195.1

OTHER REFERENCES

"Jour. of American Chemical Soc.," vol. 86, May 5, 1964, pp. 1901 and 1902.

"Jour. of the Electrochemical Soc.," vol. 106, No. 4, April 1959, pp. 347–354.

HOWARD S. WILLIAMS, *Primary Examiner.*

T. TUNG, *Assistant Examiner.*